United States Patent
Ho et al.

(10) Patent No.: US 8,163,226 B2
(45) Date of Patent: *Apr. 24, 2012

(54) STABILIZED POLYETHYLENE MATERIAL

(75) Inventors: Thoi H. Ho, Lake Jackson, TX (US); Detlef Schramm, Waedenswil (CH); Pak-Meng Cham, Lake Jackson, TX (US); Kalyan Sehanobish, Rochester, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/787,695

(22) Filed: May 26, 2010

(65) Prior Publication Data

US 2010/0233403 A1     Sep. 16, 2010

Related U.S. Application Data

(63) Continuation of application No. 10/579,360, filed as application No. PCT/US2004/040695 on Dec. 3, 2004, now Pat. No. 7,744,972.

(60) Provisional application No. 60/527,053, filed on Dec. 4, 2003.

(51) Int. Cl.
*B29D 23/00* (2006.01)
*B32B 1/08* (2006.01)

(52) U.S. Cl. ........................... 264/454; 428/36.9

(58) Field of Classification Search .............. 428/36.9; 430/505, 512; 264/454, 464; 524/323, 543
See application file for complete search history.

(56) References Cited

U.S. PATENT DOCUMENTS

| | | | |
|---|---|---|---|
| 4,579,900 A | 4/1986 | Chatterjee et al. | |
| 4,650,903 A | 3/1987 | Son et al. | |
| 5,028,645 A | 7/1991 | Gugumus et al. | |
| 5,032,632 A * | 7/1991 | Saxton | 524/139 |
| 5,260,371 A | 11/1993 | Chen | |
| 5,266,362 A | 11/1993 | Katoh et al. | |
| 5,549,048 A | 8/1996 | Godfrey-Phillips et al. | |
| 6,329,465 B1 | 12/2001 | Takahashi et al. | |
| 6,642,313 B1 | 11/2003 | Kazakov et al. | |
| 6,770,341 B1 | 8/2004 | Bohm et al. | |
| 2004/0260001 A1 * | 12/2004 | Lin et al. | 524/474 |

FOREIGN PATENT DOCUMENTS

| | | |
|---|---|---|
| DE | 2946954 A1 | 6/1981 |
| DE | 276585 A3 | 3/1990 |
| EP | 0 077 948 A1 | 5/1983 |
| EP | 0 101 785 A2 | 3/1984 |
| EP | 0 538 509 A1 | 4/1993 |
| WO | WO 96/08532 * | 3/1996 |
| WO | WO-96/08532 A1 | 3/1996 |
| WO | WO-97/29152 A2 | 8/1997 |
| WO | WO-00/01765 A1 | 1/2000 |
| WO | WO-00/18814 A1 | 4/2000 |
| WO | WO-01/25328 A1 | 4/2001 |
| WO | WO 03/020821 * | 3/2003 |
| WO | WO-03/020821 A1 | 3/2003 |

OTHER PUBLICATIONS

International Search Report (PCT/US2004/040695).

* cited by examiner

*Primary Examiner* — Rena Dye
*Assistant Examiner* — Erik Kashnikow

(57) ABSTRACT

Stabilized polyethylene materials which offer an advantageously balanced combination of thermal, mechanical and processing properties, and which maintain their physical properties in chlorinated water environments are disclosed. The materials include an antioxidant system with components to provide extraction resistance in hot water environments and additionally provides oxidation resistance to both chlorine in the water interior of the pipe and oxygen in contact with the pipe's exterior.

4 Claims, No Drawings

STABILIZED POLYETHYLENE MATERIAL

CROSS-REFERENCE TO RELATED APPLICATIONS

The present application is a continuation application of the U.S. application Ser. No. 10/579,360 filed on May 10, 2006 now U.S. Pat. No. 7,744,972, entitled "STABILIZED POLYETHYLENE MATERIAL," the teachings of which are incorporated by reference herein, as if reproduced in full hereinbelow, which is a 371 of PCT/US04/40695 with of filing date of Dec. 3, 2004 which claims priority from the U.S. Provisional Application No. 60/527,053 filed on Dec. 4, 2003, entitled "STABILIZED POLYETHYLENE MATERIAL," the teachings of which are incorporated by reference herein, as if reproduced in full hereinbelow.

The present invention relates to stabilized polyethylene resin and in particular a stabilized multimodal polyethylene resin as well as compositions containing such resin. The present invention also relates to applications of such resin or composition, for example to make a shaped article. The resin and composition of the invention are particularly suitable for use in pipes.

Polyethylene is known for use in shaped articles including pipes. Polyethylene compositions with a multimodal molecular weight distribution (MWD), for example a bimodal MWD, can offer distinct advantages compared with unimodal polyethylenes or other polyolefins. For example, bimodal polyethylenes may combine the favorable mechanical properties afforded by a high molecular weight polyethylene with the good processability of a low molecular weight polyethylene. The prior art reports that such materials can advantageously be employed in various applications, including film or pipe applications. Prior art multimodal polyethylenes suggested for use in pipes include the materials disclosed in the PCT applications with the publication numbers WO 97/29152, WO 00/01765, WO 00/18814, WO 01/02480 and WO 01/25328.

In view of the potentially disastrous consequences of material failures, acceptance of any plastic pipe for water or gas distribution is subject to product standards and performance requirements set forth in norms, for example, DIN (German Industrial Norm or "Deutsche Industrie Norm") or norms defined by ISO (International Organization for Standardization, Geneva, Switzerland). Examples of such standards include EN ISO 15877:2003 Plastics piping systems for hot and cold water installations—Chlorinated poly(vinyl chloride) (PVC-C)(including the following Parts: Part 1: General (the present standard), Part 2: Pipes, Part 3: Fittings, Part 5: Fitness for purpose of the system, Part 7: Guidance for the assessment of conformity (CEN ISO/TS 15877-7)); EN ISO 15874, Plastics piping systems for hot and cold water installations—Polypropylene (PP) (ISO 15874:2003; EN ISO 15875, Plastics piping systems for hot and cold water installations—Crosslinked polyethylene (PE-X) (ISO 15875:2003); EN ISO 15876, Plastics piping systems for hot and cold water installations—Polybutylene (PB) (ISO 15876:2003); ISO 22391, Plastics piping systems for hot and cold water installations—PE-RT; DIN 16833 Pipes made from polyethylene of raised temperature-resistance (PE-RT) General Quality Requirements Testing; DIN 4721 Plastic piping systems for warm water floor heating and radiator connections; polyethylene of raised temperature resistance (PE-RT); Oenorm B 5159 Plastics piping systems of polyethylene with raised temperature resistance (PE-RT) for hot and cold water installations. Each of these standards are hereby incorporated by reference in their entirety.

State of the art polyethylene materials sold into pipe applications, such as irrigation pipes, sewage pipes, domestic pipes (including under floor heating, snow melt systems, hot and cold water delivery) may have to meet specific standards. For example polyethylene materials sold for pressure pipes, may have to meet the so-called PE80 or PE100 ratings (PE stands for polyethylene). Pipes manufactured from polyethylenes classifying as PE80-type or PE100-type resins must withstand a minimum circumferential stress, or hoop stress, of 8 MPa (PE80) or 10 MPa (PE100) at 20° C. for 50 years. PE100 resins are high density polyethylene (HDPE) grades typically having a density of at least about 0.950 g/cm$^3$ or higher.

Their relatively poor Long Term Hydrostatic Strength (LTHS) at high temperatures has been an acknowledged disadvantage of traditional polyethylenes which rendered these materials unsuitable for use in piping with exposure to higher temperatures, such as domestic pipe applications. Domestic pipe systems typically operate at pressures between 2 and 10 bar and temperatures of up to about 70° C. with malfunction temperatures of 95-100° C. Domestic pipes include pipes for hot and/or cold water in pressurized heating and drinking water networks within buildings as well as pipes for snow melt or heat recovery systems. The performance requirements for the various classes of hot water pipes, including underfloor heating, radiator connectors and sanitary pipes are specified, for example, in International Standard ISO 10508 (first edition Oct. 15, 1995, "Thermoplastic pipes and fittings for hot and cold water systems").

In many applications chlorine is added to the water to be used as a disinfectant. Chlorinated water systems present additional challenges for plastic pipe systems, as chlorine exposure is known to increase failure rates for plastics piping systems (that is, less time is needed until a leak is detected). It is known that chlorine reacts with polyethylene in an oxidation-reduction reaction resulting in the polymer degradation. Antioxidants are typically used to counter the effect of chlorine, but it has been discovered that conventional anti-oxidants used with resins currently used in pipe applications can be extracted by the water in a relatively short period of time.

Accordingly, there is still the need for new stabilized polyethylene materials which offer an advantageously balanced combination of thermal, mechanical and processing properties, and which maintain their physical properties in chlorinated water environments. It is an object of the present invention to meet these and other needs.

It has been discovered that at least three factors effect the stability of plastic pipes used with chlorinated water systems. First, the exterior of the pipes is exposed to oxygen in the air. Second, the interior of the pipes are exposed to chlorine in the water. Antioxidants can be used to increase the resistance of the pipe to either of these factors, however it has been discovered that each antioxidant is not equally effective against each of these environmental factors. Another factor which was observed to have a relationship to the long term stability of pipes in chlorinated water systems, is the ability of the antioxidants to resist extraction from the water from the interior of the pipe. Currently there are no known antioxidant systems which satisfactorily address the combination of all of these factors for standard polyethylene resins.

Accordingly, the present invention provides a class of resins which shows an increased affinity towards additives in that the additives are less likely to be extracted in a water-containing environment. The present invention also provides a particular combination of antioxidant additives which demonstrate a synergistic effect in lengthening the oxidation induction time for plastic pipes in a chlorinated water systems.

The preferred resin for use in present invention is a polyethylene resin with a density in the range of from 0.925 g/cc to 0.965 g/cc. The density chosen will depend on the intended use, with lower density materials providing greater flexibility but also exhibiting less high temperature resistance and lower modulus. For some applications densities above about 0.940 g/cc will be most preferred. The resin should also have a melt index ($I_2$) in the range of from 0.05 g/10 minutes to 5 g/10 minutes, more preferably in the range of 0.1 to 1 g/10 minutes.

The antioxidant additives of the present invention comprise at least two antioxidants which operate synergistically for the environment of a pipe for use with a chlorinated water supply. Accordingly, one of the antioxidants should be chosen for its performance with respect to the atmosphere external to the pipe, and another antioxidant should be chosen for its performance with respect to chlorine exposure in the interior of the pipe. Preferred antioxidants include hindered phenols, phosphites and phosphonites.

The present invention also relates to applications of such formulated polyethylene resin and composition and to shaped articles such as pipes, made from such polyethylene resin or composition.

Basic Definitions

The term "interpolymer" is used herein to indicate polymers prepared by the polymerization of at least two monomers. The generic term interpolymer thus embraces the terms copolymer, usually employed to refer to polymers prepared from two different monomers, and polymers prepared from more than two different monomers, such as terpolymers.

Unless indicated to the contrary, all parts, percentages and ratios are by weight.

The abbreviation "ccm" stands for cubic centimeters.

Unless expressly specified otherwise, the term "melt index" means the $I_2$ melt index, as determined in accordance with ASTM D1238 under a load of 2.16 kg and at a temperature of 190° C.

Unless specified otherwise, the term "alpha-olefin" (α-olefin) refers to an aliphatic or cyclo-aliphatic alpha-olefin having at least 4, preferably from 4 to 20 carbon atoms.

The present invention provides a polyethylene resin with a density of at least about 0.925 g/cc, more preferably about 0.930 g/cc, most preferably about 0.940 g/cc. The polyethylene resin can have a maximum density of about 0.965 g/cc. The resin should also have a melt index ($I_2$) in the range of from 0.05 g/10 minutes to 5 g/10 minutes, more preferably in the range of 0.1 to 1 g/10 minutes. The resin can also advantageously have a multimodal molecular weight distribution. Preferred resins for use in the present invention, and suitable processes for making them are taught in WO 03/020821. The resins used in the present invention may be crosslinked according to methods known in the art, but this is not required, and in fact for many applications it is preferred that the resins not be crosslinked.

While not intending to be bound by theory, it is hypothesized that the higher density materials achieve better results because of their crystalline structure. The higher the density of the material the less amorphous regions it contains. It is believed that water can penetrate these amorphous regions and extract antioxidant located there, whereas the water cannot penetrate the crystalline regions. Thus, the higher density materials offer less areas from which the antioxidants may be extracted, resulting in higher concentration of antioxidant material over time. It should be noted that this effect improves the performance of all antioxidants and not just the preferred combination of antioxidants of the present invention. It will readily be understood by those skilled in the art that this beneficial effect of reducing antioxidant extraction observed when using the high density material does not counter other physical limitations of high density materials, such as generally poorer toughness and flexibility. Thus the particular resin used should be optimized for the needs of a particular application The present invention also provides compositions comprising the high density polyethylene resin of the invention and an antioxidant package comprising at least two antioxidant additives. It was discovered that antioxidants to not respond to different elements equally. Thus, some antioxidants are better at preventing deterioration of a pipe when exposed to air, whereas others may be better at preventing deterioration of the same pipe when exposed to chlorine. Accordingly, for the present invention, one antioxidant additive should be selected for its efficacy as an antioxidant when exposed to air, and the other antioxidant additive should be chosen for its efficacy when exposed to chlorine. The choice of antioxidant may also change depending on whether the resin is to be cross-linked. For efficacy against exposure to water, it is known to use a first class of antioxidants comprising hindered phenols corresponding to the formula:

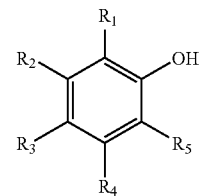

Wherein $R_1$ and $R_5$ can independently be —CH3, —CH($CH_3$)$_2$, or —C($CH_3$)$_3$, and $R_2$, $R_3$, and $R_4$ can independently be any hydrocarbon or substituted hydrocarbon group.

The R groups should be selected such that the specific antioxidant will be more than five percent soluble in a hexane solution at 20° C. As will be appreciated by one of ordinary skill in the art, this means that polar groups should generally be avoided. In order to determine hexane solubility, the material is ground into powder having an average particle size of approximately 300 microns. Twenty grams of this powder is then added to 100 grams of hexane, and stirred at room temperature for 5 hours. The solid is then filtered, dried and weighed and the percent solubility calculated from the difference between the weight of the powder before and after stirring.

The hydrolyzed product of the antioxidant should also be more than five percent soluble in a hexane solution at 20° C. To determine the solubility of the hydrolyzed product, the antioxidant is first hydrolyzed by dissolving the antioxidant in a solvent such as acetone or dioxane. Water is then added in an amount to provide a solution having five percent by weight water. This solution is then refluxed for seven days or until the material is completely hydrolyzed. The solution is then evaporated to recover the solid and the solubility of this material is determined as above.

An example of the first class of antioxidants suitable for use in the present invention is 3,3',3", 5,5',5"-hexa-tert-Butyl-alpha,alpha',alpha"-(mesitylene-2,4,6-triyl)tri-p-cresol (CAS 1709-70-2) commercially available as IRGANOX™ 1330 (Ciba Specialty Chemicals) or 1,3,5-trimethyl-2,4,6- tris(3,5-di-tert-butyl-4-hydroxybenzyl)benzene commercially available as ETHANOX™ 330 (Albemarle Corporation).

However, it was discovered that this first class of antioxidants is not as effective against chlorine and oxygen exposure as desired. For efficacy against chorine exposure and oxygen in the air, a second class of antioxidants is preferred.

The second class of antioxidants correspond to the same general formula as the first class wherein $R_1$ and $R_5$ can be —CH3, —CH(CH$_3$)$_2$, or —C(CH$_3$)$_3$, and $R_2$, $R_3$, and $R_4$ can independently be any hydrocarbon or substituted hydrocarbon group provided that R2, R3 and R4 are chosen such that the antioxidant does not contain the moiety Ph-CHR$_6$-Ph, where Ph represents a phenyl ring and R$_6$ can be H or a phenyl ring. Examples of the second class of antioxidants include Pentaerythritol Tetrakis(3-(3,5-di-tert-butyl-4-hydroxyphenyl)propionate) (CAS 6683-19-8) available as IRGANOX™ 1010 (Ciba Specialty Chemicals); Octadecyl-3-(3,5-di-tert-butyl-4-hydroxyphenyl)-propionate (CAS 002082-79-3) available as IRGANOX™ 1076; 1,3,5-tris(3,5-di-tert-butyl-4-hydroxybenzyl)-1,3,5-triazine-2,4,6(1H,3H,5H)-trione (CAS 2767-62-6) available as IRGANOX™ 3114; 1,3,5-TRIS(4-tert-butyl-3-hydroxy-2,6-dimethyl benzyl)-1,3,5-triazine-2,4,6-(1H,3H,5H)-trione (CAS 040601-76) available as Cyanox 1790 (CyTech Industries); Ethylenebis (oxyethylene)bis-(3-(5-tert-butyl-4-hydroxy-m-tolyl)-propionate) (CAS 36443-68-2) available as IRGANOX™ 245; 1,6-Hexamethylene bis(3,5-di(tert)-butyl-4-hydroxyhydrocinnamate (CAS 35074-77-2) available as IRGANOX™ 259; Thiodiethylene bis[3-(3,5-di-tert-butyl-4-hydroxyphenyl)propionate] (CAS 41484-35-9) available as IRGANOX™ 1035; and mixtures thereof.

For use in pipes intended for use with chlorinated water, therefore, it has been discovered that an additive package comprising at least one antioxidant from the first class together with at least one antioxidant from the second class leads to synergistic results. It is preferred that the resin used to make the pipes contain from at least about 300 more preferably 400 and most preferably about 500 ppm up to about 5000 ppm, more preferably about 4000 ppm, most preferably about 3000 ppm of each class of additive.

Other additives may also be added to the resin or the antioxidant package, including still other antioxidants which may be more effective at preventing oxidation at higher temperatures which the resin may be exposed to during extrusion. Such antioxidants include phosphites and phosphonites such as Tris(2,4-ditert-butylphenyl)phosphate (CAS 31570-04-4) available as IRGAFOS™ 168. Metal deactivators such as 2',3-bis[[3-[3,5-di-tert-butyl-4-hydroxyphenyl]propionyl]] propionohydrazide. (CAS 32687-78-8) available as IRGANOX™ MD 1024 and 2,2'-oxalyldiamidobis[ethyl 3-(3,5-di-t-butyl-4-hydroxyphenyl)propionate] (available as NAUGARD™ XL1); processing aids; UV stabilizers; other antioxidants; pigments or colorants can also be advantageously used with the compositions of the present invention.

When used to make pipes for use with chlorinated water, the resin of the present invention contains hindered phenols such as 3,3',3'', 5,5',5''-hexa-tert-Butyl-alpha,alpha',alpha''-(mesitylene-2,4,6-triyl)tri-p-cresol (CAS 1709-70-2) commercially available as IRGANOX™ 1330, hindered phenols such as Pentaerythritol Tetrakis(3-(3,5-di-tert-butyl-4-hydroxyphenyl)propionate) (CAS 6683-19-8) commercially available as IRGANOX™ 1010 and/or Octadecyl-3-(3,5-di-tertbutyl-4-hydroxyphenyl)-propionate (CAS 002082-79-3) commercially available as IRGANOX™ 1076, phosphites such as Tris(2,4-ditert-butylphenyl)phosphate (CAS 31570-04-4) commercially available as IRGAFOS™ 168 and metal deactivators such as 2',3-bis[[3-[3,5-di-tert-butyl-4-hydroxyphenyl]propionyl]]propionohydrazide. (CAS 32687-78-8) commercially available as IRGANOX™ MD 1024 and/or 2,2'-oxalyldiamidobis[ethyl 3-(3,5-di-t-butyl-4-hydroxyphenyl)propionate] commercially available as NAUGARD™ XL1.

The resins or compositions of the present invention can be used to manufacture a shaped article. Such article may be a single-layer or a multi-layer article, which is obtainable by suitable known conversion techniques applying heat, pressure or a combination thereof to obtain the shaped article. Suitable conversion techniques include, for example, blow-molding, co-extrusion blow-molding, injection molding, injection stretch blow molding, compression molding, extrusion, pultrusion, calendering and thermoforming. Shaped articles provided by the invention include, for example, films, sheets, fibers, profiles, moldings and pipes.

The polyethylene resins and compositions according to the present invention are particularly suitable for durable application, especially pipes—without the need for cross-linking. Pipes comprising polyethylene resin as provided herein are another aspect of the present invention and include monolayer pipes as well as multilayer pipes, including multilayer composite pipes. The pipes of the invention comprise the high density polyethylene resin in form of a composition (formulation) which also contains the antioxidant package of the present invention, and optionally other additives or fillers.

Monolayer pipes according to the present invention consist of one layer made from a composition according to the present invention comprising a high density polyethylene resin together with an antioxidant package as provided herein and any additional suitable additives typically used for pipe applications. Such additives include colorants and materials, such as, for example, process stabilizers, pigments, metal de-activators, and UV protectors.

Multilayer composite pipes comprising one or more, for example, one or two, layers wherein at least one layer comprises a composition according to the present invention, are also possible. In such cases the high density resin should be used at least for the inner layer as this is the layer which is exposed to the water. It should be understood that in a multilayer pipe, the antioxidant package used with the high density resin may be different and the resin may not be exposed to air. Such multilayer pipes include, for example, three-layer composite pipes with the general structure PE/Adhesive/Barrier, or five-layer pipes with the general structure PE/Adhesive/Barrier/Adhesive/PE or Polyolefin/Adhesive/Barrier/Adhesive/PE. In these structures PE stands for polyethylene layers which can be made from the same or different polyethylene compositions. Suitable polyolefins include, for example, high density polyethylene, polypropylene and polybutylene, homopolymers and interpolymers. The barrier layer may be an organic polymer capable of providing the desired barrier properties, such as an ethylene-vinyl alcohol copolymer (EVOH), or a metal, for example, aluminum or stainless steel.

The invention is further illustrated by the following Examples, which, however, shall not be construed as a limitation of the invention.

EXAMPLES

Various resin formulations were prepared by first blending a masterbatch containing additives to a base resin in order to achieve the additive levels (in ppm) specified in Table 1. For examples 1-8 the base resin was an ethylene/octene resin with a density of 0.941 g/cc and a melt index (I$_2$) of 0.85 g/10 min (determined according to ASTM D-1238, condition E, 190°

C./2.16 kg). For Example 9 the base resin was polyethylene resin having a density of 0.933 and a melt index ($I_2$) of 0.7. For Example 10, the base resin was a polyethylene resin having a density of 0.9345 g/cc and a melt index ($I_2$) of 0.6. In Table 1, AO 1 is IRGANOX™ 1330 (3,3',3", 5,5',5"-hexa-tert-Butyl-alpha,alpha',alpha"-(mesitylene-2,4,6-triyl)tri-p-cresol (CAS 1709-70-2)), a hindered phenol antioxidant; MD is a metal deactivator, (NAUGARD™ XL1 (2,2'-oxalyldiamidobis[ethyl 3-(3,5-di-t-butyl-4-hydroxyphenyl)propionate]) for Examples 1, 3, 4, 6, 8, and 9 and IRGANOX™ MD1024 (2',3-bis[[3-[3,5-di-tert-butyl-4-hydroxyphenyl]propionyl]] propionohydrazide. (CAS 32687-78-8)) for Examples 2 and 5); AO2 is Chimassorb™ 944 a hindered amine antioxidant; AO3 is IRGAFOS™ 168 (Tris(2,4-ditert-butylphenyl)phosphate (CAS 31570-04-4), a phosphite antioxidant; AO4 is IRGANOX™ 1010 (Pentaerythritol Tetrakis(3-(3,5-di-tert-butyl-4-hydroxyphenyl)propionate) (CAS 6683-19-8)), a hindered phenol antioxidant; and AO5 is IRGANOX™ 1076 (Octadecyl-3-(3,5-di-tert.butyl-4-hydroxyphenyl)-propionate (CAS 002082-79-3)), a hindered phenol.

The formulated resins were then extruded at commercial pipe extrusion lines to make pipes having a 17 mm (except for Example 9 which was 16 mm and Example 10 which was 16 mm) outer diameter and a 2 mm thickness. These pipes were evaluated for chlorine resistance according to Jana Laboratories Procedure APTF-2, and the time until failure (F time) is reported in the last column of Table 1. The testing conditions were as follows: pH 6.8 (±0.1); Chlorine 4.1 mg/L (±0.1); Nominal ORP 830 mV; fluid temperature 110° C. (±1); air temperature 110° C. (±1); pressure 70 psig (±1); flow rate 0.1 Us gallons/min (±10 percent).

At a later point in time a second set of tests were run and reported as Samples 11-19. These samples were all made with the base resin was an ethylene/octene resin with a density of 0.941 g/cc and a melt index ($I_2$) of 0.85 g/10 min (determined according to ASTM D-1238, condition E, 190° C./2.16 kg). The MD was NAUGARD™ XL1 (2,2'-oxalyldiamidobis [ethyl 3-(3,5-di-t-butyl-4-hydroxyphenyl)propionate]) for Samples 11-13 and 15-19 and IRGANOX™ MD1024 (2',3-bis[[3-[3,5-di-tert-butyl-4-hydroxyphenyl]propionyl]]propionohydrazide. (CAS 32687-78-8)) for Sample 14. The pipes prepared were all 16 mm in diameter. The testing method was identical to that previously described.

| Sample | AO1 | MD | AO2 | AO3 | AO4 | AO5 | F time (hr) |
|---|---|---|---|---|---|---|---|
| 1 | 2329 | 621 | 0 | 960 | 0 | 399 | 1473 |
| 2 | 2373 | 648 | 0 | 959 | 0 | 422 | 1088 |
| 3 | 2207 | 644 | 32.4 | 930 | 0 | 413 | 1531 |
| 4 | 0 | 500 | 0 | 1085 | 0 | 401 | 841 |
| 5 | 0 | 815 | 0 | 1099 | 0 | 388 | 991 |
| 6 | 982 | 521 | 1020 | 959 | 0 | 422 | 957 |
| 7 | 0 | 0 | 0 | 1660 | 1259 | 410 | 1496 |
| 8 | 1336 | 711 | 1020 | 956 | 0 | 408 | 989 |
| 9 | 2200 | 764 | 0 | 0 | 225 | 0 | 1050 |
| 10 | 0 | 0 | 0 | 2000 | 1800 | 0 | 398 |
| 11 | 0 | 0 | 0 | 1200 | 0 | 500 | 386 |
| 12 | 2250 | 750 | 0 | 1190 | 1022 | 497 | 1237 |
| 13 | 0 | 750 | 0 | 1191 | 2252 | 497 | 1336 |
| 14 | 2250 | 750 | 0 | 1190 | 1022 | 497 | 1232 |
| 15 | 1500 | 750 | 0 | 1190 | 2012 | 497 | 1622 |
| 16 | 2250 | 0 | 0 | 1191 | 1022 | 497 | 1330 |
| 17 | 3375 | 1125 | 0 | 1190 | 2 | 496 | 1351 |
| 18 | 4500 | 1500 | 0 | 1188 | 2 | 496 | 1275 |
| 19 | 3375 | 750 | 0 | 1188 | 2012 | 496 | 1524 |

What is claimed is:

1. A process for making a pipe consisting essentially the steps of:
    selecting an ethylene alpha-olefin interpolymer composition, wherein said ethylene alpha-olefin interpolymer composition has a density in the range of 0.925 to 0.965 g/cc, a melt index ($I_2$) in the range of 0.05 to 5 g/10 minutes; and
    selecting an antioxidant system, wherein said antioxidant system consist essentially of;
        from 500 to 5000 ppm of 3,3',3",5,5',5"-hexa-tert-butyl-α, α', α"-(mesitylene-2,4,6-triyl)tri-p-cresol;
        from at least 300 to 5000 ppm of Pentaerythritol Tetrakis (3-(3,5-di-tert-butyl-4-hydroxyphenyl)propionate), Octadecyl-3-(3,5-di-tert.butyl-4-hydroxyphenyl)-propionate, or combinations thereof;
        from 500 to 5000 ppm of Tris(2,4-ditert-butylphenyl) phosphate;
    optionally one or more metal deactivators;
    forming said alpha-olefin interpolymer composition and said antioxidant system into a pipe;
    wherein said pipe has an F time in Jana Laboratories Procedure APTF-2 of at least 1000 hours, under the following conditions: pH 6.8 (±0.1); Chlorine 4.1 mg/L (±0.1); Nominal ORP 830mV; fluid temperature 110° C. (±1); air temperature 110° C. (±1); pressure 70 psig (±1); flow rate 0.1 US gallons/min (±10 percent).

2. The process of claim 1, wherein the ethylene alpha-olefin interpolymer composition is multimodal.

3. The process of claim 1, wherein the ethylene alpha-olefin interpolymer composition has a density in the range of 0.940 to 0.965 g/cc.

4. The process of claim 1, wherein said pipe has an F time in the range of greater than 1200 hours.

* * * * *